United States Patent [19]

Dinger et al.

[11] Patent Number: 4,522,358
[45] Date of Patent: Jun. 11, 1985

[54] METHOD AND APPARATUS FOR THE DISPLACEMENT OF TWO THRUST REVERSERS OF JET ENGINES OF AN AIRCRAFT IN SYNCHRONISM DURING THE THRUST REVERSAL PHASE

[75] Inventors: Hans Dinger, Friedrichshafen; Hilbert Holzhauer, Stetten; Erberhard Lang, Grafelfing, all of Fed. Rep. of Germany

[73] Assignee: MTU, Munich, Fed. Rep. of Germany

[21] Appl. No.: 503,695

[22] Filed: Jun. 13, 1983

[30] Foreign Application Priority Data

Jun. 16, 1982 [DE] Fed. Rep. of Germany ....... 3222672

[51] Int. Cl.³ ................................................. F02K 1/60
[52] U.S. Cl. ............................... 244/110 B; 244/76 R
[58] Field of Search ............... 244/110 B, 12.5, 23 D, 244/76 R, 75 R, 78; 60/226.2, 228, 230, 232, 242; 239/265.19, 265.25, 265.29, 265.31, 265.37; 91/271

[56] References Cited

U.S. PATENT DOCUMENTS

| | | | |
|---|---|---|---|
| 2,487,402 | 11/1949 | Watson | 91/171 |
| 2,706,886 | 4/1955 | Michel | 60/242 |
| 3,655,134 | 4/1972 | Greenland et al. | 244/110 B |
| 3,931,944 | 1/1976 | Capewell et al. | 244/110 B |
| 4,343,226 | 8/1982 | Ribeiro de Almeida | 91/171 |
| 4,391,409 | 7/1983 | Scholz | 60/226.2 |

FOREIGN PATENT DOCUMENTS 1334518 10/1973 United Kingdom ............ 244/110 B

Primary Examiner—Trygve M. Blix
Assistant Examiner—Rodney Corl
Attorney, Agent, or Firm—Posnack, Roberts, Cohen & Spiecens

[57] ABSTRACT

A system for the displacement of two thrust reversers for two jet engines of an airplane. Each thrust reverser has a drive motor operated by compressed air, a valve controlling the flow of compressed air to the motor, a set-point indicator including an input piston controllable by the action of compressed air, a differential transmission, and a feedback system from the motor to the differential transmission. The valve is actuated by the input piston and the motor via the differential transmission. The displacement of the two thrust reversers is halted by a system of stops acting on the input pistons at identical intermediate points in the paths of travel thereof and the displacement is thereafter continued after the thrust reversers have both reached their intermediate points in their paths of travel by deactivation of the stops.

27 Claims, 3 Drawing Figures

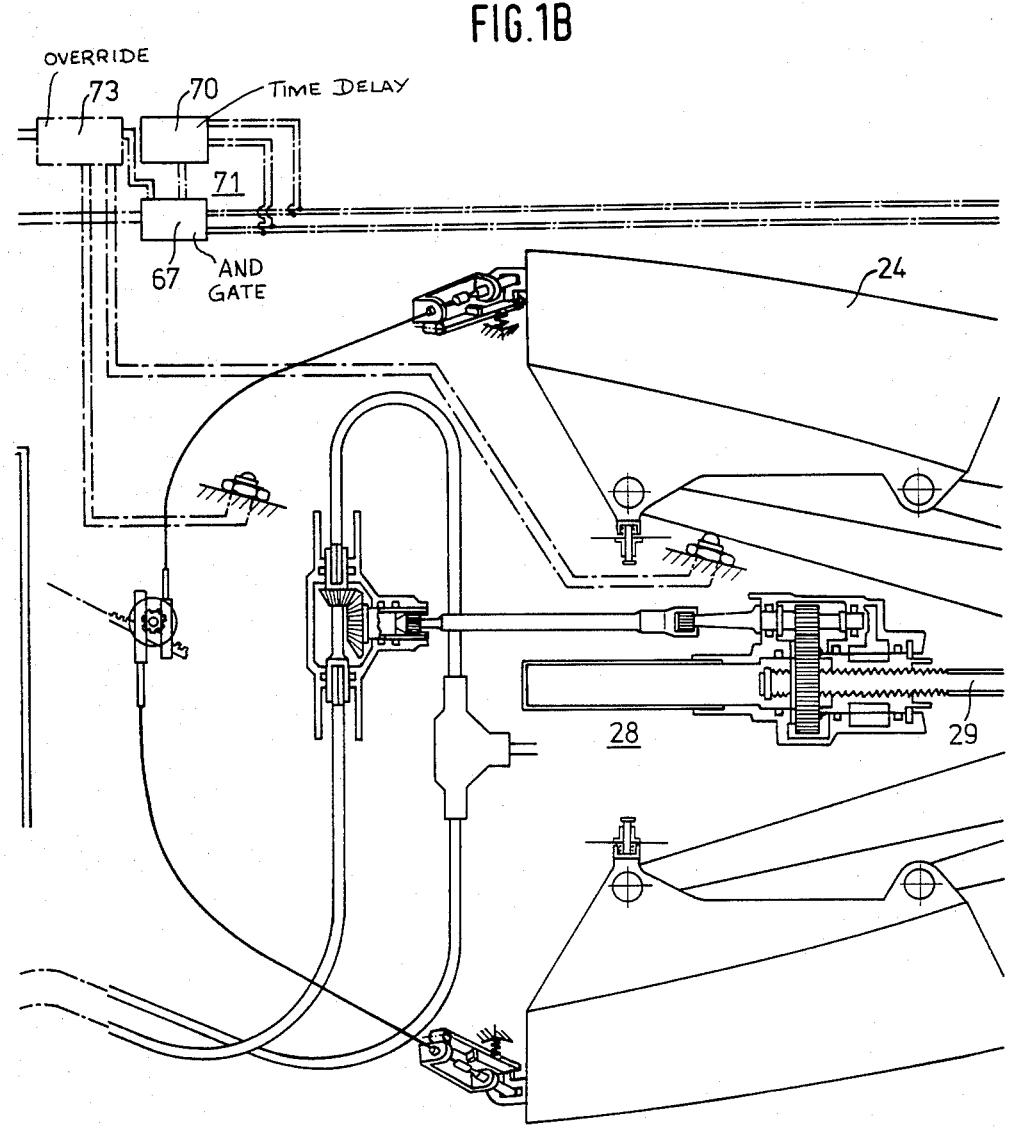

METHOD AND APPARATUS FOR THE DISPLACEMENT OF TWO THRUST REVERSERS OF JET ENGINES OF AN AIRCRAFT IN SYNCHRONISM DURING THE THRUST REVERSAL PHASE

FIELD OF INVENTION

The invention relates to methods and apparatus for the displacement of two thrust reversers of jet engines of an aircraft and in particular to synchronous displacement of the thrust reversers during the thrust reversal phase. Each thrust reverser is included in a respective system comprising a compressed air motor for driving the thrust reverser, a valve for controlling the operation of the motor by controlling the flow of compressed air thereto, and a set point indicator system for operating the valve to control the displacement of the respective motor. The operation of the valve is effected through a differential transmission which is acted on by the set point indicator and by a feed back from the motor to provide a follower operation.

PRIOR ART

West German Application DE-OS No. 2 413 702 discloses a single system incorporating a thrust reverser of a jet engine which includes means for unlocking a locking system for the thrust reverser in order to permit the extension thereof.

When separate systems are employed for displacing respective thrust reversers, a problem arises in that the two thrust reversers generally are displaced at different speeds due to uncontrollable conditions such as different air leakages at input piston drives, different magnitudes of friction in differential transmissions of drive and in bearings and in flexible drive shafts of flaps of the two thrust reversers and different magnitudes of air supply pressure for the two systems. Such different air leakages exert a great influence due to the relatively small working volume in the cylinders of the input system drives. The aforesaid bearings are incorporated in the differential transmissions, the piston rods of the input piston drives and in levers of the differential transmissions.

SUMMARY OF THE INVENTION

An object of the present invention is to provide a method and apparatus for the displacement of two thrust reversers for two jet engines of an airplane in which the speeds of extension of the two thrust reversers will be substantially synchronized.

In order to satisfy the above and further objects of the invention, it is proposed that the displacement of the two thrust reversers be halted or interrupted at identical intermediate points in the paths of travel thereof and thereafter such interruption is eliminated to permit the displacement of the thrust reverses after they have both reached said intermediate points in their paths of travel.

Thereby, the slower thrust reverser catches up at the intermediate point whereupon the interruption of the extension for both thrust reversers immediately and simultaneously eliminated and both thrust reversers thereafter continue their displacement up to the final positions of displacement. The result is that the displacement of the two thrust reversers is substantially synchronized and the two thrust reversers commence their thrust reversal phases simultaneously at substantially the intermediate position and reach their final displacement positions with substantially no difference in time, particularly since the intermediate positions generally are closer to the end of the path of travel than to the beginning of the displacement paths.

A feature of the invention is that synchronization can be reliably effected with dependable and relatively simple elements.

In further accordance with the invention, the displacement of the thrust reversers in the thrust reversal phase is an extension movement and the thrust reversal operation is generally achieved in the last 25% of the extension of the thrust reversers.

In accordance with a feature of the invention, the halting or interruption of the extension of the thrust reversers takes place at the initiation of the thrust reversal phase and is effected by the provision of pneumatically controlled stops in the form of pneumatic cylinders. The pneumatic cylinders are activated to interrupt extension of the thrust reversers by the supply of compressed air to the cylinders and deactivation is effected by discharging the compressed air from the cylinders. However, instead of pneumatic cylinders, electrically operated stops can also be used, particularly with the use of electric motors as set point indicators for the drive of the valves which control the operation of the compressed air motors.

In accordance with a further feature of the invention, the pneumatic cylinders are controlled by respective electromagnetically controlled valves which selectively supply compressed air to the pneumatic cylinders or permit discharge of the compressed air therefrom. This is a simple and reliable system providing effective control of the stops electrically.

In order to control the electromagnetic valves, the invention contemplates the provision of position indicator means on each thrust reverser which is activated when the respective thrust reverser reaches its displacement position for interruption and signals are fed from the position indicators of the two thrust reversers to an AND gate to simultaneously eliminate the interruption of the extension of both thrust reversers when they have both reached the predetermined interruption positions.

BRIEF DESCRIPTION OF DRAWING

The invention is described in detail hereinafter with reference to a preferred embodiment thereof which is illustrated in the appended drawing wherein FIGS. 1A, 1B and 1C show respective portions of the preferred embodiment of the invention.

DETAILED DESCRIPTION

Figure 1A:
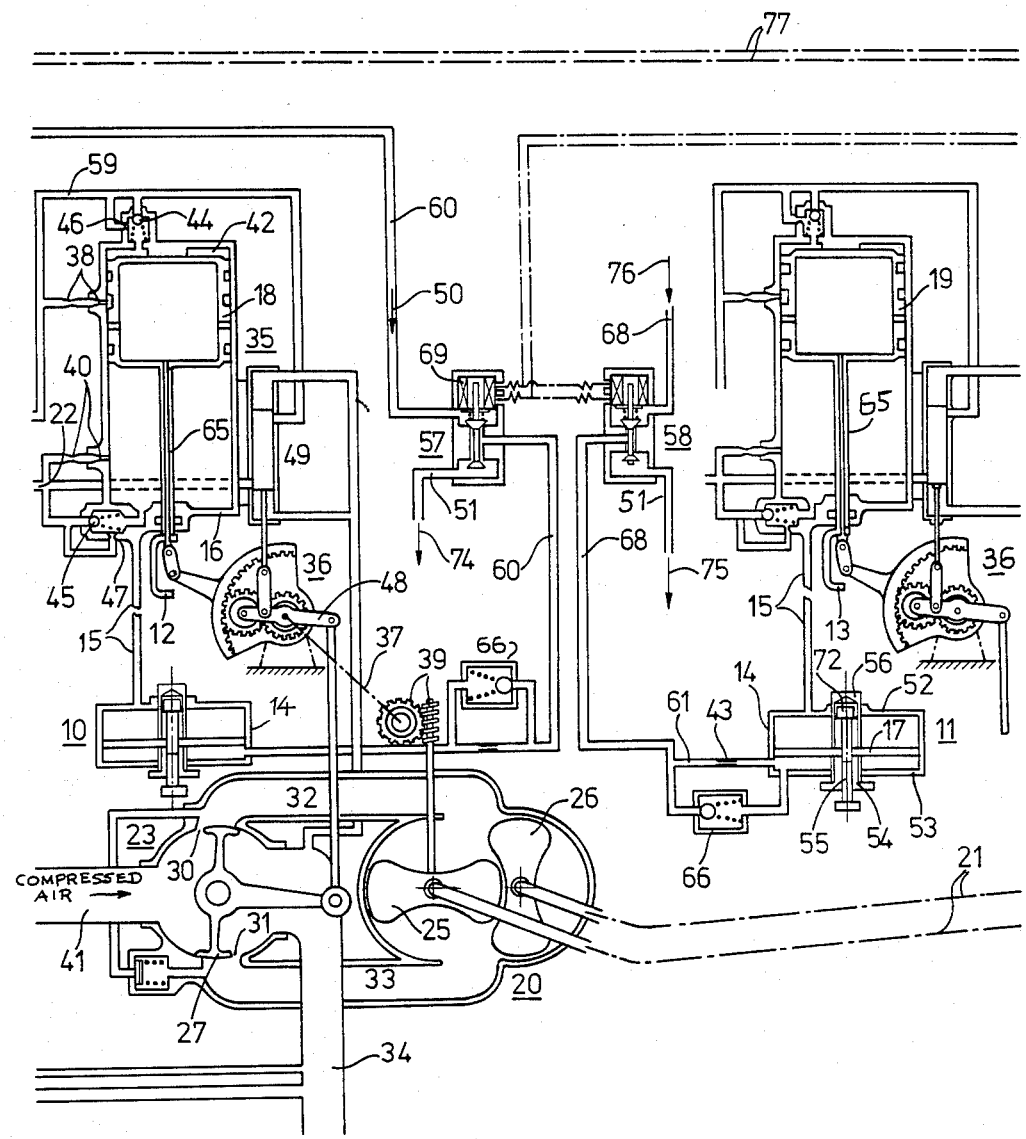
Figure 1C:
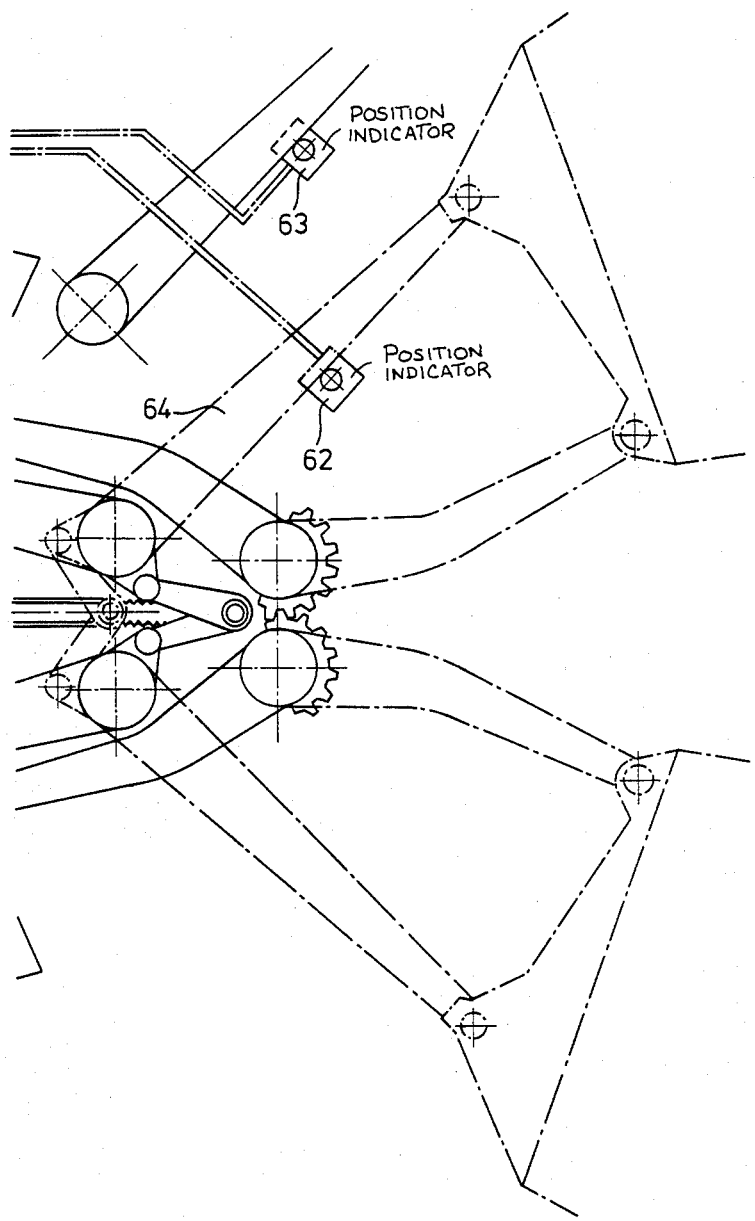

In the drawing is shown an embodiment of an apparatus for the displacement of thrust reversers of a jet engine constituted by two flaps 24 denoted as thrust reversal flaps each associated with a respective identical compressed air motor 20. The flaps 24 are each incorporated in a respective independent system with motor 20. For the sake of simplicity, only one of the two motors 20 has been shown.

Each motor 20 has two rotary bodies 25 and 26 whose directions of rotation can be jointly reversed. Each motor 20 actuates its associated thrust reverser to extend and retract the flap 24, depending on the direction of rotation of the rotary bodies 25, 26. The rotary bodies act via flexible shafts 21 and transmission 28 to displace the flaps. The flaps 24 are shown in solid lines in fully retracted position and in chain dotted lines extended to 75% of their fully extended positions. Two ball roll spindles 29 in the respective transmission 28 are axially displaced parallel to each other in accordance with the rotation of the rotary bodies 25,26 and thereby of the displacement of the flaps. A given displacement or angular position of the flaps 24 is associated with each point of the path of travel of the bodies 25,26.

For each motor 20, the displacement system further includes a respective rotary slide valve 23 for controlling the flow of compressed air to the motor. The motor 20 and the rotary slide valve 23, together with two channels 32 and 33 which connect them together form a structural unit. Compressed air can be fed to the rotary slide valve 23 by a compressor (not shown) of the engine via a feed conduit 41 which contains a shut-off valve (not shown). By means of a rotary slide valve member 27, the flow of compressed air through two diametrically opposite ports 30 and 31 of identical size can be controlled, and depending on the direction of rotation for the opening of the rotary slide valve member 27, the rotary bodies 25, 26 can be driven by the compressed air in one of the other direction of rotation. The exhaust air is discharged through a discharge conduit 34.

The displacement system further comprises two identical set point indicators for actuating the rotary slide valves 23. The set point indicators comprise respective input pistons 18 and 19 serving as set point pistons or time pre-set pistons. The rotary slide valve member 27 is actuated by the associated input piston through its piston rod 65 and a differential transmission 36, the piston being displaceable or controllable by the action of compressed air within a cylinder 35 in which the piston is slidable. The transmission 36 of each piston is subject to the action of the corresponding motor 20 via respective feedback system 37 each having a step-down worm gearing 39. If the input piston 18 or 19 is acted on by compressed air from above in its upper position as shown, the piston will be moved downwards and the associated flap 24 will be extended. The motor 20, rotary slide valve 23 and differential transmission 36 together serve as a follower system which follows the movement of the input piston. This constitutes a position controller. Its operation, which is conventional, involves displacement of the piston 18 or 19 which results in corresponding displacement of the flap and when the piston stops, the follower system serves to close valve member 27 and halt the displacement of the flap. As a consequence, displacement of piston 18 and 19 results in precise corresponding displacement of its associated flap 24. The position of a lever 48 on the differential transmission 36 is a measure of the control deviation i.e. the displacement of the valve member 27. By means of a slide valve 49, increase in the control deviation above a permissible amount is prevented.

For the control of the input pistons 18 and 19 by compressed air, there are used a follow-up valve (slide valve) (not shown), two non-return valves 44 and 45 provided at the ends of the cylinder 35 for the admission of the compressed air into the corresponding high pressure space 42 of the cylinder 35, and two throttle openings 46,47 of the cylinder 35 which are provided at said ends and four throttle openings 38 and 40 provided in front of said ends. From the follow-up valve, an air conduit 59 extends to the throttle openings 38 and 46 and to the non-return valve 44, and an air conduit 22 extends to the throttle openings 40 and 47 and to the non-return valve 45. The desired direction of movement of the input piston for extending or retracting the thrust reverser is obtained for each input piston by a corresponding adjustment of a corresponding direction-selection valve (not shown) by means of compressed air via the follow-up valve.

The displacement system includes a synchronizing system for extending the two thrust reversers or pairs of flaps 24 in synchronization. The synchronizing system includes two identical, pneumatically controllable stops 10 and 11 for selectively interrupting the extension of the flaps. The stops 10 and 11 cooperate with respective mating stop elements 12 and 13 which are secured to piston rods 65 for movement together with the input pistons 18 and 19. The stops 10 and 11 are respectively contained in a housing 15 which is secured to the bottom of cylinder 35. Also contained in the housing 15 is the differential transmission 36. The stops 10 and 11 each includes a cylinder which is coaxial with the input pistons 18 and 19 and has a cylindrical wall 14 with two end walls 52 and 53. The end wall 52 is integrally formed with the housing 15 but the cylinder could be separately formed and secured to the bottom of the housing 15, preferably by means of threaded connectors. Within the cylinder is a slidable piston 17. The piston 17 is displaceable on a central bolt 55 which faces the input cylinder 18 or 19 via a coaxial adjustment nut 54 which is screwed through the end wall 53 and extends into the inside of the cylinder. The bolt 55 is screwed into nut 54 until it abuts against a stop 72. On the bolt 55 is placed a coaxial stop sleeve 56 which extends through the end wall 52 and forms a closed end facing the mating stop element 12 or 13. The stop sleeve 56 forms a rigid unit with the piston 17.

Each of the two adjustment nuts 54 is so adjusted axially that when the piston 17 abuts against the adjustment nut 54 the distance between the piston 17 and the stop 72 represents 25% of the total path of displacement of the input piston 18 or 19. With this position of the piston 17 and with the initial position of extension shown for the input piston 18 or 19, the distance between the mating stop element 12 or 13 and the stop sleeve 56 is equal to this total displacement path. This distance is reduced to 75% of the total displacement path by displacement of the piston 17 from the adjustment nut 54 to the stop 72 and therefore the displacement of the stop sleeve 56 to its stop position.

Into the cylinders of stops 10 and 11 respectively extend air conduits 60 and 68 which extend to a shut-off valve (not shown) in feed conduit 41. Air conduits 60 and 68 respectively include electromagnetically operated valves 57 and 58 for selectively supplying compressed air to the respective piston 17 or discharging compressed air. Each of the valves 57 and 58 includes an electromagnet 69 and is connected to a compressed air discharge line 51. In the compressed air supply lines 60 and 68 are non-return valves 66 between the valves 57 and 58 and the respective cylinders 14 of the stops 10 and 11. Furthermore, an air conduit 61 for the discharge of compressed air from each cylinder by-passes the non-return valve 66. Each conduit 61 contains a throttle 43 and discharges into the air conduits 60 and 68 between the non-return valve 66 and the valves 57 and 58 respectively.

If the two electromagnets 69 are energized via an electric device 71, the two valves 57 and 58 are opened against spring force to admit compressed air via conduits 60 and 68 while concurrently closing off discharge of compressed air from stops 10 and 11 to conduits 51.

Consequently, compressed air flows through the air conduits 60 and 68 in the direction of arrows 50 and 76 through the opened non-return valves 66 and into the cylinders 14 of the stops 10 and 11. The compressed air acts on the pistons 17 to urge the latter and the stop sleeves 56 into the stop position to hold them thereat.

If now, for instance, the stop element 12 comes into contact with the corresponding stop sleeve 56, extension of the corresponding thrust reverser is interrupted. If the mating stop element 13 lags behind stop element 12, then the stopped element 12, and thus the associated thrust reverser will wait until the stop element 13 contacts its corresponding stop sleeve 56. Thereupon the extension of the thrust reverser associated with stop element 13 will be interrupted and the positions of the two thrust reversers will be identical with respect to each other.

The synchronizing system of the thrust reversers further includes electric position indicators 62 and 63 respectively which are securely attached to the corresponding jet engine and can be actuated by a lever 64 of a displacement lever system of the thrust reverser during the extension of the flaps 24. The position indicators 62 and 63 are so arranged that their actuation is effected by the corresponding lever 64 shortly before the corresponding thrust reverser has reached the position which is determined by the contact of the corresponding stop element 12 or 13 against the corresponding stop sleeve 56 in the stop position.

If, after the actuation of the two position indicators 62 and 63 by the two levers 64 (which generally do not arrive simultaneously), the two position signals of the two position indicators 62 and 63 are fed to an AND gate 67 of the electrical device 71, this indicates that both thrust reversers have reached the positions determined by the position indicators. The AND gate interrupts electric current to the two electromagnets 69 which are thereby simultaneously deactivated at the same instant. Thereby, the two valves 57 and 58 are simultaneously closed by their respective springs to halt supply of compressed air from conduits 60 and 68 and open the discharge conduits 51 so that compressed air is discharged from the cylinders 14 via conduits 61 (with the non-return valves 66 closed), conduits 60 and 68, valves 57 and 58 and conduits 51 in the direction of arrows 74 and 75. In this way therefore the interruption of the extension of the flaps is eliminated simultaneously for both thrust reversers. The units consisting in each case of the stop sleeve 56 and the piston 17 can travel, practically without resistance, to the adjustment nuts 54. By deenergizing both electromagnets 69 when the mating stop elements 12 and 13 abut against the stop sleeves 56 at the same time, the two sleeves 56 are rendered inactive simultaneously with each other and both thrust reversers commence the thrust reversal phase, i.e. the last 25% of the total displacement or extension travel at the same time, as a result of which they reach their final extension positions substantially simultaneously.

An electric time delay member 70 in device 71 provides a desired time interval between the arrival of the lagging thrust reverser at the place of interruption of the extension and the joint restarting of the two thrust reversers so that the two signals present at the AND gate 67 are passed only after this time interval. This time interval is generally very small.

In the case of a defect or failure of one jet engine or thrust-reverser system, it is possible, through actuation by the pilot of an override device 73, to influence the AND gate 67 in such a manner that the circuit to the electromagnets 69 is interrupted and thus the synchronizing connection between the two thrust-reversal systems or individual systems is eliminated. The override device 73 is in the electric circuit 77 between the AND gate 67 and the direction-selection valve (not shown) controlled by the pilot.

Although the invention has been described in relation to specific embodiments thereof, it will become apparent to those skilled in the art that numerous modifications and variations can be made withouth departing from the scope and spirit of the invention as defined by the attached claims.

What is claimed is:

1. In a system for the displacement of two thrust reversers for two jet engines of an airplane, each thrust reverser having a drive motor operated by compressed air, a valve controlling the flow of compressed air to the motor, set-point indicator means including an input piston controllable by the action of compressed air, a differential transmission, and a feedback system from said motor to said differential transmission, said valve being actuated by said input piston and said motor via said differential transmission, the improvement comprising means for interrupting the displacement of one of said thrust reversers at an intermediate point in the path of travel thereof in the event that said one thrust reverser reaches said intermediate point before the other thrust reverser reaches a corresponding intermediate point in its path of travel, and means for eliminating such interruption of the displacement only when both of the thrust reversers have reached their respective said intermediate points in their paths of travel whereafter the thrust reversers simultaneously commence travel through the remainder of their paths of travel.

2. The improvement as claimed in claim 1 wherein said interrupting means comprises a stop means for each input piston, said means for eliminating the interruption of the displacement of the thrust reversers acting on said stop means to deactivate the same.

3. The improvement as claimed in claim 2 wherein said means for eliminating the interruption of the displacement of the thrust reversers comprises position indicator means for each thrust reverser for being actuated after a predetermined displacement of said thrust reverser, and AND gate means connected to the position indicator means of both thrust reversers for producing a signal to eliminate the interruption of the displacement of the thrust reversers only after both thrust reversers have been halted after undergoing their said predetermined displacement, said AND gate means being operative to deactivate said stop means upon production of said signal.

4. The improvement as claimed in claim 3 wherein each stop means includes a piston, a stop member on said piston, and means for applying compressed air against said piston to hold the piston and stop member in a stop position, said means for deactivating the stop means including means for discharging the compressed air applied against said piston to permit free travel of said piston upon production of said signal by said AND gate means.

5. The improvement as claimed in claim 2 wherein each stop means includes a piston, a stop member on said piston, and means for applying compressed air against said piston to hold the piston and stop member in a stop position, said means for deactivating the stop means including means for discharging the compressed air applied against said piston to permit free travel of said piston.

6. The improvement as claimed in claim 5 wherein each said set point indicator means comprises a housing slidably receiving said input piston, said stop means including a cylinder secured to said housing such that said stop member can halt the travel of the input piston.

7. The improvement as claimed in claim 6 comprising a stop element secured to said input piston for travel therewith, said stop member being aligned in the path of travel of said stop element for contact therewith.

8. The improvement as claimed in claim 5 comprising electromagnetically operated valve means for each stop means for controlling flow of compressed air thereto and therefrom.

9. The improvement as claimed in claim 1 wherein said means for eliminating the interruption of the displacement of the thrust reversers comprises position indicator means for each thrust reverser for being actuated after a predetermined displacement of said thrust reverser, and AND gate means connected to the position indicator means of both thrust reversers for producing a signal to eliminate the interruption of the displacement of the thrust reversers only after both thrust reversers have been halted after undergoing their said predetermined displacement.

10. In a method for the displacement of two thrust reversers for two jet engines of an airplane, each thrust reverser having a drive motor operated by compressed air, a valve controlling the flow of compressed air to the motor, set-point indicator means including an input piston controllable by the action of compressed air, a differential transmission, and a feedback system from said motor to said differential transmission, said valve being actuated by said input piston and said motor via said differential transmission, said method comprising interrupting the displacement of one of said thrust reversers at an intermediate point in the path of travel thereof in the event that said one thrust reverser reaches said intermediate point before the other thrust reverser reaches a corresponding intermediate point in its path of travel, and eliminating such interruption of the displacement only when both of the thrust reversers have reached their respective said intermediate points in their paths of travel whereafter the thrust reversers simultaneously commence travel through the remainder of their paths of travel.

11. The method as claimed in claim 10 wherein said interrupting of the displacement of the thrust reversers is effected by the action of compressed air.

12. The method as claimed in claim 11 wherein the elimination of the interruption of the displacement of the thrust reversers is effected by discharging the compressed air.

13. The method as claimed in claim 10 wherein the thrust reversers undergo displacement through first and second successive stages in which thrust reversal is effected in the second stage, the thrust reversers being halted at the beginning of the second stage.

14. The method as claimed in claim 13 wherein the first stage represents about 75% of the total displacement of the thrust reverser.

15. The method as claimed in claim 10 wherein said thrust reversers are displaced at different speeds due to uncontrollable conditions, one thrust reverser undergoing displacement faster than the other, the faster thrust reverser being interrupted at its respective intermediate point until the slower thrust reverser has reached its respective intermediate point whereafter the thrust reversers commence simultaneous travel.

16. In a system for the displacement of two thrust reversers for two jet engines of an airplane, each thrust reverser having a drive motor operated by compressed air, a valve controlling the flow of compressed air to the motor, set-point indicator means including an input piston controllable by the action of compressed air, a differential transmission, and a feedback system from said motor to said differential transmission, said valve being actuated by said input piston and said motor via said differential transmission, the improvement comprising means for interrupting the displacement of each of the two thrust reversers at respective intermediate points in the paths of travel thereof, and means for eliminating such interruption of the displacement of the thrust reversers, said means for eliminating the interruption of the displacement of the thrust reversers including position indicator means for each thrust reverser and means connected to said position indicator means and to said interrupting means for automatically deactivating the latter when both thrust reversers have reached their respective said intermediate points in their paths of travel whereafter the thrust reversers simultaneously commence travel through the remainder of their paths of travel.

17. The improvement as claimed in claim 16 wherein said thrust reversers are displaced in extension and retraction, said interruption and its subsequent elimination being effected by said means during extension of said thrust reversers.

18. The improvement as claimed in claim 17 wherein said interrupting means comprises a stop means for each input piston, said means for eliminating the interruption of the displacement of the thrust reversers acting on said stop means to deactivate the same.

19. The improvement as claimed in claim 18 wherein each stop means includes a piston, a stop member on said piston, and means for applying compressed air against said piston to hold the piston and stop member in a stop position, said means for deactivating the stop means including means for discharging the compressed air applied against said piston to permit free travel of said piston.

20. The improvement as claimed in claim 19 comprising electromagnetically operated valve means for each stop means for controlling flow of compressed air thereto and therefrom.

21. The improvement as claimed in claim 19 wherein each said set point indicator means comprises a housing slidably receiving said input piston, said stop means including a cylinder secured to said housing such that said stop member can halt the travel of the input piston.

22. The improvement as claimed in claim 21 comprising a stop element secured to said input piston for travel therewith, said stop member being aligned in the path of travel of said stop element for contact therewith.

23. The improvement as claimed in claim 18 wherein said position indicator means for each thrust reverser is actuated after a predetermined displacement of said thrust reverser, said means for eliminating the interruption of the displacement of the thrust reversers comprising AND gate means connected to the position indicator means of both thrust reversers for producing a signal to eliminate the interruption of the displacement of the thrust reversers only after both thrust reversers have been halted after undergoing their said predetermined displacement, said AND gate means being operative to deactivate said stop means upon production of said signal.

24. The improvement as claimed in claim 23 wherein each stop means includes a piston, a stop member on said piston, and means for applying compressed air against said piston to hold the piston and stop member in a stop position, said means for deactivating the stop means including means for discharging the compressed air applied against said piston to permit free travel of said piston upon production of said signal by said AND gate means.

25. The improvement as claimed in claim 16 wherein said position indicator means for each thrust reverser is actuated after a predetermined displacement of said thrust reverser, said means for eliminating the interruption of the displacement of the thrust reversers comprising AND gate means connected to the position indicator means of both thrust reversers for producing a signal to eliminate the interruption of the displacement of the thrust reversers only after both thrust reversers have been halted after undergoing their said predetermined displacement.

26. The improvement as claimed in claim 16 wherein the displacement of the thrust reversers includes first and second successive displacement phases, thrust reversal being effected in the second phase, said interrupting being effected at the beginning of said second phase.

27. The improvement as claimed in claim 16 wherein said thrust reversers are displaced at different speeds due to uncontrollable conditions, one thrust reverser undergoing displacement faster than the other, the faster thrust reverser being interrupted at its respective intermediate point by said interrupting means until the slower thrust reverser has reached its respective intermediate point whereafter the thrust reversers commence simultaneous travel.

* * * * *